(12) United States Patent
Yamanaka

(10) Patent No.: US 11,989,030 B2
(45) Date of Patent: May 21, 2024

(54) AUTONOMOUS WORK SYSTEM

(71) Applicant: HONDA MOTOR CO., LTD., Tokyo (JP)

(72) Inventor: Makoto Yamanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 103 days.

(21) Appl. No.: 17/481,944

(22) Filed: Sep. 22, 2021

(65) Prior Publication Data

US 2022/0129007 A1 Apr. 28, 2022

(30) Foreign Application Priority Data

Oct. 22, 2020 (JP) .................................. 2020-177430

(51) Int. Cl.
*G05D 1/02* (2020.01)
*A01D 34/00* (2006.01)
*G05D 1/00* (2006.01)

(52) U.S. Cl.
CPC ........... *G05D 1/0265* (2013.01); *A01D 34/00* (2013.01); *G05D 1/0287* (2013.01)

(58) Field of Classification Search
CPC .............. G05D 1/0265; G05D 1/0287; G05D 2201/02; G05D 1/0297; G05D 2201/0208; A01D 34/00
See application file for complete search history.

(56) References Cited

U.S. PATENT DOCUMENTS

| 2012/0041594 A1* | 2/2012 | Abramson ............... G01S 11/06 342/450 |
| 2013/0006419 A1* | 1/2013 | Bergstrom ............ G05D 1/0278 700/245 |
| 2016/0014955 A1* | 1/2016 | Hans ..................... A01D 34/008 901/41 |
| 2017/0311534 A1* | 11/2017 | Rusciolelli ........... A01B 79/005 |
| 2018/0303031 A1* | 10/2018 | Araki .................... A01D 41/127 |
| 2020/0073403 A1* | 3/2020 | Abramson ............ G05D 1/0088 |
| 2020/0331547 A1* | 10/2020 | Kowalchuk .............. B60K 1/00 |

FOREIGN PATENT DOCUMENTS

| JP | 2016-099895 A | | 5/2016 |
| JP | 2020017083 A | * | 1/2020 |
| WO | 2016084482 A1 | | 6/2016 |

OTHER PUBLICATIONS

English Translation of Foreign Patent (JP-2020017083-A) (Year: 2020).*

* cited by examiner

*Primary Examiner* — Rachid Bendidi
*Assistant Examiner* — Dana F Artimez
(74) *Attorney, Agent, or Firm* — Thomas| Horstemeyer, LLP

(57) ABSTRACT

An autonomous work system controls an autonomous work machine that detects a magnetic field of an area signal generated by energization to an area wire disposed on an outer periphery of a work area, specifies a boundary of the work area based on the magnetic field, and works autonomously in the work area. The autonomous work system comprises: a storage unit configured to store position information of a plurality of the work areas; a setting unit configured to set, based on the position information, different energization modes; and an energization unit configured to energize, based on the energization modes, the area wires disposed on the respective outer peripheries of the plurality of adjacent work areas.

11 Claims, 10 Drawing Sheets

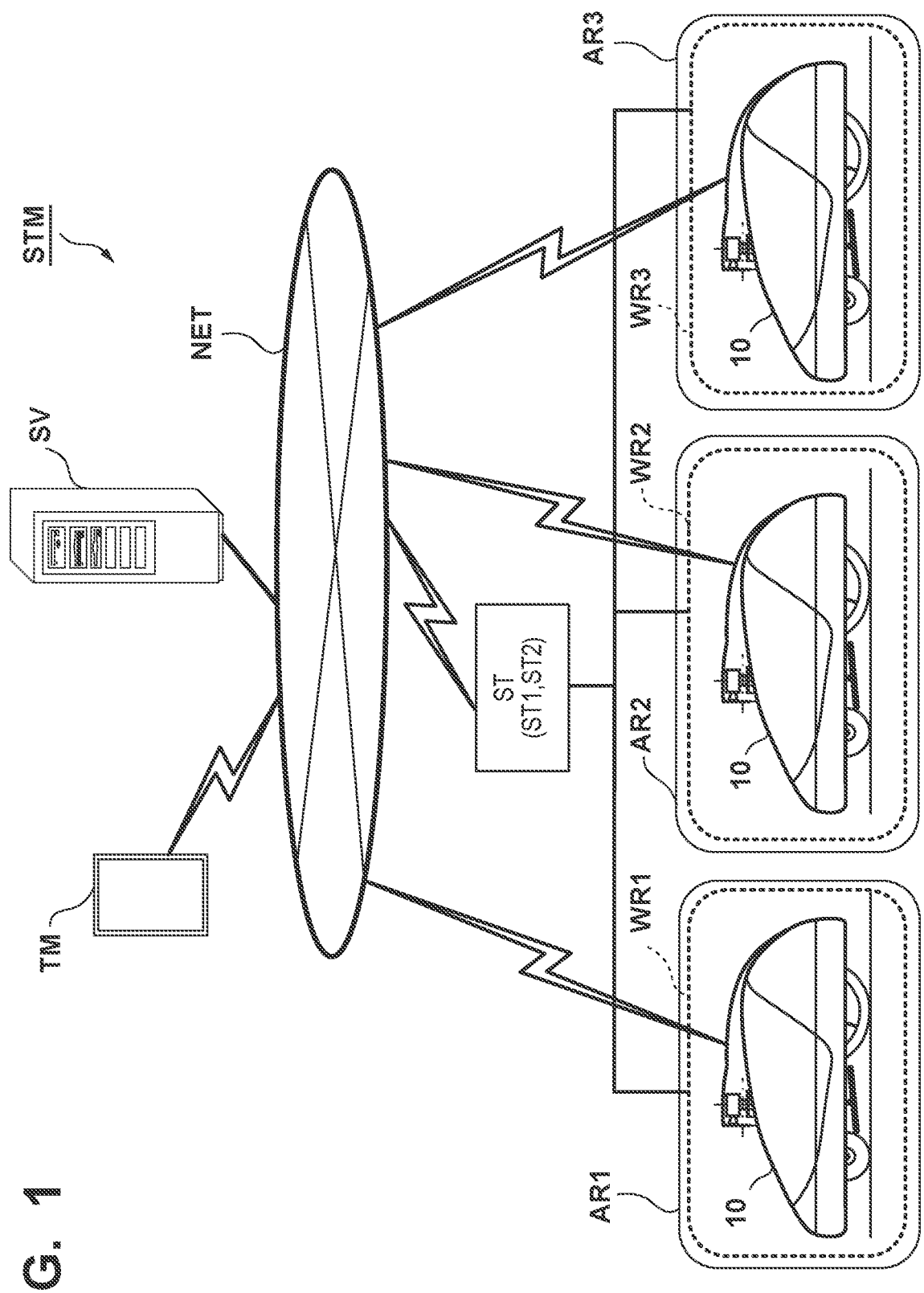

FIG. 9

| WORK AREA | POSITION INFORMATION |
|---|---|
| AR1 | (x11, y11)-(x12, y12) |
| AR2 | (x21, y21)-(x22, y22) |
| AR3 | (x31, y31)-(x32, y32) |
| AR4 | (x41, y41)-(x42, y42) |
| AR5 | (x51, y51)-(x52, y52) |
| AR6 | (x61, y61)-(x62, y62) |
| ⋮ | ⋮ |

FIG. 10

| ENERGIZATION MODE | IDENTIFICATION PATTERN |
|---|---|
| Mod1 | FREQUENCY f1 |
| Mod2 | FREQUENCY f2 |
| Mod3 | FREQUENCY f3 |
| Mod4 | FREQUENCY f4 |

AUTONOMOUS WORK SYSTEM

CROSS-REFERENCE TO RELATED APPLICATION(S)

This application claims priority to and the benefit of Japanese Patent Application No. 2020-177430 filed on Oct. 22, 2020, the entire disclosure of which is incorporated herein by reference.

BACKGROUND OF THE INVENTION

Field of the Invention

The present invention relates to an autonomous work system that controls a plurality of autonomous work machines that works in different work areas.

Description of the Related Art

Japanese Patent Laid-Open No. 2016-099895 discloses a mobile work vehicle that senses a magnetic field generated around an area wire to identify a region defined by the area wire, and autonomously travels within the region to work. However, in a case where interference between area signals generated by energization to area wires occurs in a plurality of work areas at adjacent positions, position specifying accuracy for specifying a boundary of a self-work area may decrease in a mobile work vehicle that works in each work area.

The present invention has been made in view of the above drawbacks, and provides an autonomous work technique that enables suppressing interference between the area signals by setting different energization modes such that the area signals corresponding to a plurality of adjacent work areas at adjacent positions are not identical mutually.

SUMMARY OF THE INVENTION

According to one aspect of the present invention, there is provided an autonomous work system that controls an autonomous work machine that detects a magnetic field of an area signal generated by energization to an area wire disposed on an outer periphery of a work area, specifies a boundary of the work area based on the magnetic field, and works autonomously in the work area, the autonomous work system comprising: a storage unit configured to store position information of a plurality of the work areas; a setting unit configured to set, based on the position information, different energization modes, in a case where a plurality of adjacent work areas at adjacent positions is present, such that the area signals corresponding to the plurality of adjacent work areas are not identical mutually; and an energization unit configured to energize, based on the energization modes, the area wires disposed on the respective outer peripheries of the plurality of adjacent work areas.

The aspect of the present invention enables suppressing interference between the area signals by setting the different energization modes such that the area signals corresponding to the plurality of adjacent work areas at adjacent positions are not identical mutually.

BRIEF DESCRIPTION OF THE DRAWINGS

The accompanying drawings illustrating an embodiment of the present invention constitute part of the specification, and are used together with the description to describe the present invention.

FIG. 1 schematically illustrates the overview of an autonomous work system according to an embodiment;

FIG. 9 exemplarily illustrates position information of work areas stored in a memory of the information processing apparatus according to the embodiment;

FIG. 10 exemplarily illustrates the identification patterns of area signals corresponding to energization modes.

DESCRIPTION OF THE EMBODIMENTS

Figure 2A:
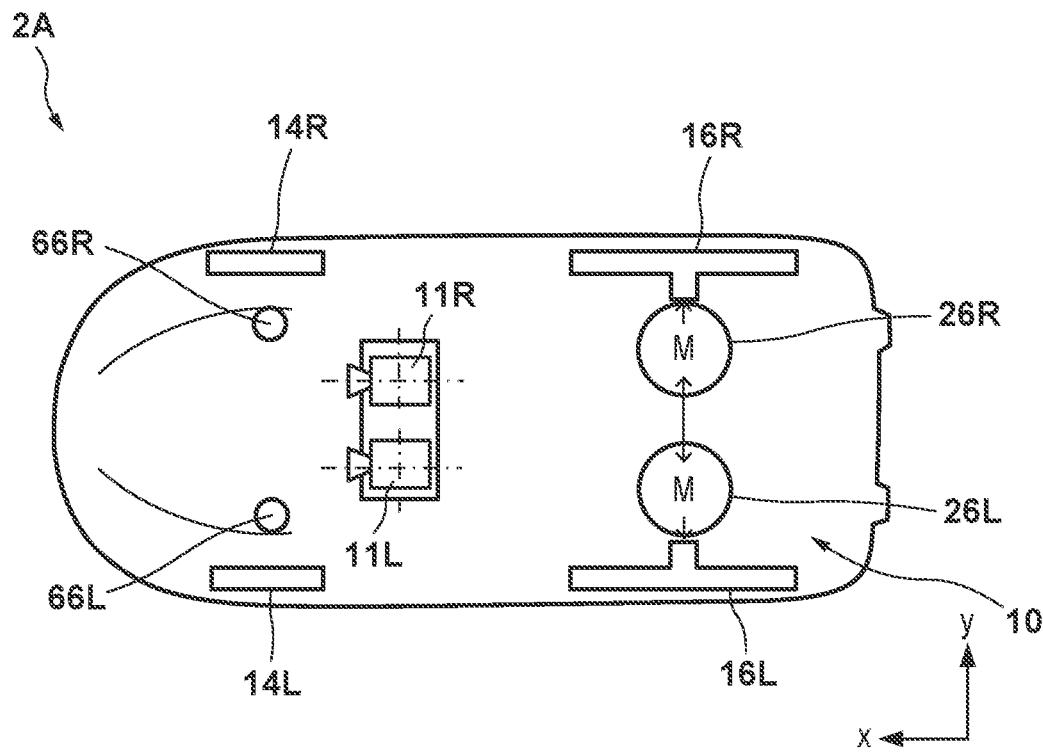
FIG. 2A is a schematic top view of an autonomous work machine according to the embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

(Overview of Autonomous Work System)

FIG. 1 schematically illustrates the overview of an autonomous work system STM according to an embodiment. The autonomous work system STM includes a plurality of autonomous work machines 10 that works in different work areas, and a control apparatus (SV, TM) that can control each autonomous work machine through communication with the plurality of autonomous work machines 10. The control apparatus includes an information processing apparatus SV (server) and a portable information terminal apparatus TM such as a smartphone that a user can operate. The information processing apparatus SV and the information terminal apparatus TM are communicable with each autonomous work machine 10 through a network NET.

The autonomous work system STM includes a charging station ST1 that supplies power to a battery mounted on each autonomous work machine 10 for charging, and the control apparatus (SV, TM) is communicable with the charging station ST1. The autonomous work system STM further includes a return station ST2 to which each autonomous work machine 10 can return from the corresponding work area, and the control apparatus (SV, TM) is also communicable with the return station ST2. In FIG. 1, the charging station ST1 and the return station ST2 are collectively referred to as a station ST. Here, FIG. 1 exemplarily illustrates that a single station ST (ST1, ST2) is provided, but this is not limiting. Thus, a plurality of stations ST (ST1, ST2) can be provided in the autonomous work system STM. In the example of FIG. 1, the single station ST energizes respective area wires WR1, WR2, and WR3 in three work areas AR1, AR2, and AR3, but this is not limiting. Thus, a single station ST can energize area wires in a plurality of work areas.

In the autonomous work system STM of the present embodiment, for example, in a case where each area wire in N (N as an integer) number of work areas is connected to the single station ST, different energization modes are set such that area signals corresponding to a plurality of adjacent work areas at adjacent positions are not identical mutually, resulting in suppressing interference between the area signals.

In FIG. 1, work is assigned to the respective autonomous work machines 10 in different work areas AR1, AR2, AR3, and . . . . An outer periphery (peripheral edge) portion is defined for the work areas AR1, AR2, and AR3 by the corresponding area wires (electric wires: WR1, WR2, and WR3). The area wires (WR1, WR2, and WR3) are each disposed on the outer periphery (peripheral edge) of the work area by being buried in the ground, for example. The autonomous work machines 10 each detect a magnetic field of an area signal generated by energization to the corresponding one of the area wires WR1, WR2, and WR3 disposed on the outer peripheries (peripheral edges) of the work areas AR1, AR2, and AR3. The autonomous work machines 10 each specify the boundary of the corresponding one of the work areas AR1, AR2, and AR3 on the basis of the detected magnetic field, to work autonomously in the work area.

The control apparatus (SV, TM) can generate a schedule for working in each work area on the basis of an operation input by the user, can transmit the generated information to the corresponding autonomous work machine 10, and can control the autonomous work machine 10 on the basis of the generated schedule. The autonomous work machine 10 works while traveling autonomously within the work area in accordance with the generated schedule.

The autonomous work machines 10 are each provided with a user interface 70 (FIG. 3) to which various user settings can be input. The user can also input, to the user interface 70, settings of a schedule, information regarding a work area, the identification pattern of an area signal corresponding to an energization mode set to the work area, and the like. Information input through the user interface 70 is stored in a memory 44c through an input-and-output interface (I/O) 44b.

For the identification pattern of the area signal, a processing unit 311 of the information processing apparatus SV by which the energization mode is set can transmit, through the communication unit 313, the identification pattern of the area signal to each autonomous work machine 10 disposed in the corresponding work area and can set the identification pattern of the area signal. A control unit C1 of a central processing unit (CPU) 44a controls execution of autonomous work in an assigned work area, on the basis of the information stored in the memory 44c.

Figure 4:
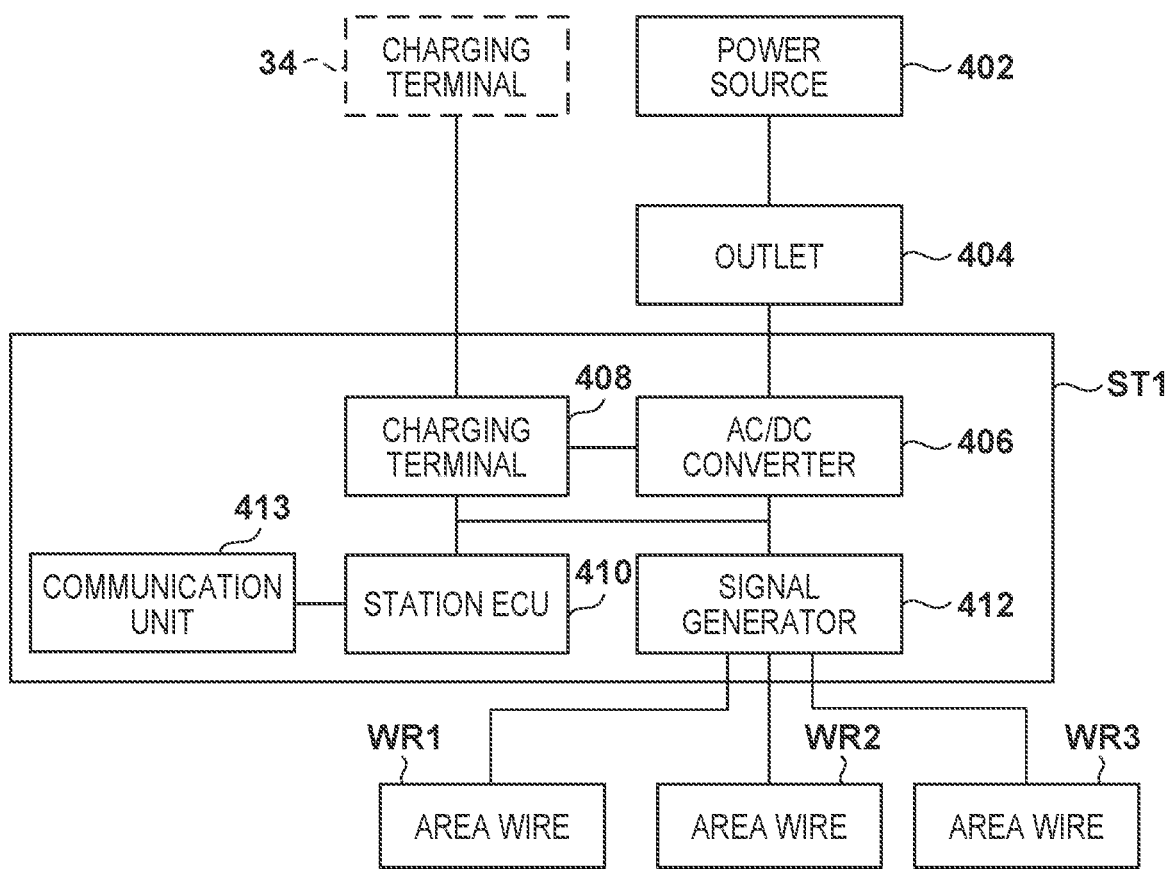
FIG. 4 is a block diagram illustrating the configuration of a charging station.

The charging station ST1 includes, for example, an energization unit (station electronic control unit (ECU) 410, signal generator 412: FIG. 4) that energizes the area wires WR1, WR2, and WR3 disposed on the outer peripheries (peripheral edges) of the plurality of work areas. The energization unit can control an energization pattern such that the area signals corresponding to the area wires of the work areas are not identical mutually, on the basis of the energization modes set by the control apparatus (SV, TM). Note that the disposition of the energization unit is not limited to the charging station ST1, and thus the energization unit can be disposed in the return station ST2 to where the respective autonomous work machines 10 can return from the work areas. Specific configurations of the charging station ST1 and the energization unit will be described in detail below.

The autonomous work machines 10 can each function as, for example, a lawn mower, a snow blower, or a cultivator that works while traveling autonomously within a work area. However, these are merely examples of an autonomous work machine, and thus the present invention is applicable to other types of work machines. In the following description, the embodiment of the present invention will be described with the configuration of a lawn mower as an example.

(Overview of Autonomous Work Machine)

Figure 2B:
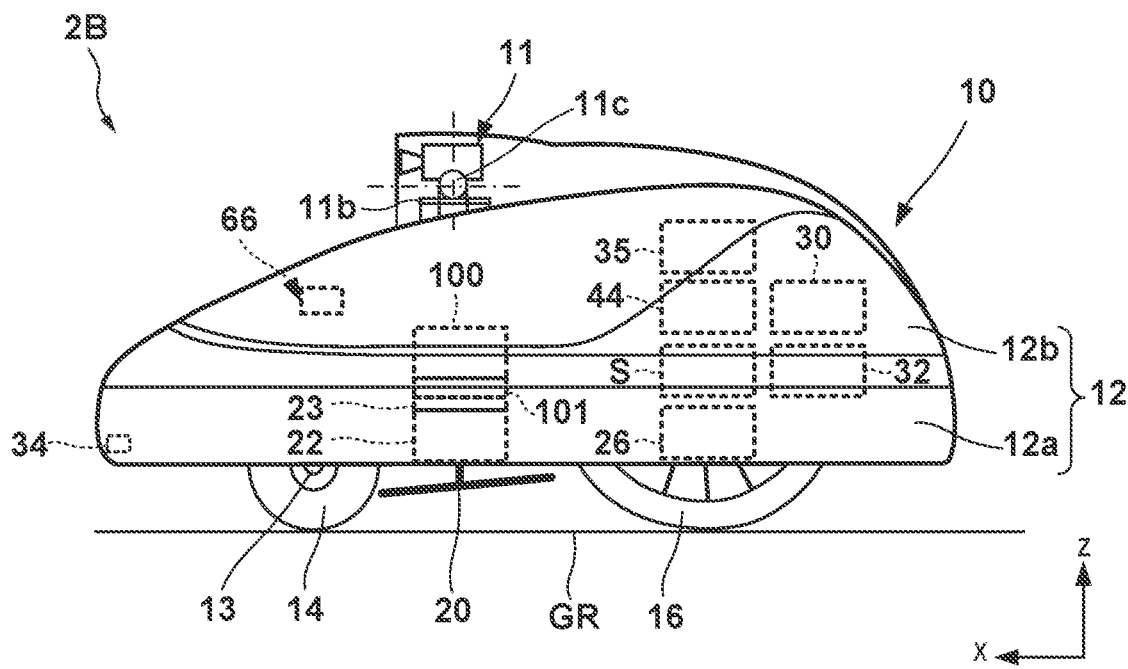
FIG. 2B is a schematic side view of the autonomous work machine.

FIG. 2A is a schematic top view of an autonomous work machine 10 according to the embodiment. FIG. 2B is a schematic side view of the autonomous work machine 10. Hereinafter, a moving direction (vehicle length direction: x direction), a lateral direction (vehicle width direction: y direction) orthogonal to the moving direction, and a vertical direction (z direction) orthogonal to the moving direction in the lateral direction in a side view of the autonomous work machine are defined, respectively, as a front-and-rear direction, a left-and-right direction (horizontal direction), and an up-and-down direction. The configuration of each part will be described in accordance with the above definition.

As illustrated in FIGS. 2A and 2B, the autonomous work machine 10 includes a camera 11, a vehicle body 12, a stay 13, a front wheel 14, a rear wheel 16, a blade 20, a work motor 22, a motor holding member 23, a blade-height adjustment unit 100, and a translation mechanism 101. The autonomous work machine 10 further includes a travel motor 26, a group of various sensors S, an electronic control unit (ECU) 44, a charging unit 30, a battery 32, a charging terminal 34, and a notification unit 35.

The camera 11 that shoots the external field of the autonomous work machine 10 includes a plurality of cameras (left camera 11L, right camera 11R) that can shoot a situation around the autonomous work machine 10. The ECU 44 can acquire information regarding the external field of the autonomous work machine 10 from the camera 11. The camera 11 can shoot ahead of the autonomous work machine 10, or a range of 360 degrees as a shooting range. The camera 11 (left camera 11L, right camera 11R) is held by a pan-angle adjustment mechanism 11b that adjusts an angle in the horizontal direction (0 to 360°) and a tilt-angle adjustment mechanism 11c that adjusts an angle in the up-and-down direction. The ECU 44 can control the angle of the camera 11 by controlling at least one of the pan-angle adjustment mechanism 11b and the tilt-angle adjustment mechanism 11c.

The vehicle body 12 of the autonomous work machine 10 includes a chassis 12a and a frame 12b attached to the chassis 12a. The front wheel 14 includes one left wheel and one right wheel (left front wheel 14L, right front wheel 14R) each having a smaller diameter and fixed to the front of the chassis 12a through the stay 13 in the front-and-rear direction. The rear wheel 16 includes one left wheel and one right wheel (left rear wheel 16L, right rear wheel 16R) each having a larger diameter and attached to the rear the chassis 12a.

The blade 20 is a rotary blade for mowing work and is attached near the central position of the chassis 12a. The work motor 22 is an electric motor disposed above the blade 20. The blade 20 is connected to the work motor 22 and is rotatably driven by the work motor 22. The motor holding member 23 holds the work motor 22. The motor holding member 23 is restricted in rotation to the chassis 12a, and is allowed to move in the up-and-down direction by, for example, the combination of a guide rail and a slider movable up and down while being guided by the guide rail.

The blade-height adjustment unit 100 is a motor for adjusting the height in the up-and-down direction of the blade 20 to the ground surface GR. The translation mechanism 101 is connected to the blade-height adjustment unit 100, and converts rotation of the blade-height adjustment unit 100 into translation in the up-and-down direction. The translation mechanism 101 is also connected to the motor holding member 23 holding the work motor 22.

The rotation of the blade-height adjustment unit 100 is converted into the translation (movement in the up-and-down direction) by the translation mechanism 101, and the translation is transmitted to the motor holding member 23. Due to the translation (movement in the up-and-down direction) of the motor holding member 23, the work motor 22 held by the motor holding member 23 is also translated (moves in the up-and-down direction). Due to the movement in the up-and-down direction of the work motor 22, the height of the blade 20 to the ground surface GR can be adjusted.

The travel motor 26 includes two electric motors (prime movers) (left travel motor 26L, right travel motor 26R) attached to the chassis 12a of the autonomous work machine 10. The two electric motors are connected one-to-one to the left and right rear wheels 16. Independent rotation of the left and right wheels forward (rotation in the forward direction) or rearward (rotation in the rearward direction) with the front wheel 14 as a driven wheel and the rear wheel 16 as a drive wheel allows the autonomous work machine 10 to move in various directions.

The charging terminal 34 is provided at the front-end position in the front-and-rear direction of the frame 12b, and is connected to the corresponding charging terminal 408 (FIG. 4) of the charging station ST1 to receive power supplied from the charging station ST1. The charging terminal 34 is connected to the charging unit 30 through wiring, and the charging unit 30 is connected to the battery 32. In addition, the work motor 22, the travel motor 26, and the blade-height adjustment unit 100 are connected to the battery 32, and are supplied with power from the battery 32.

The ECU 44 is an electronic control unit including a microcomputer provided on a circuit board, and controls the operation of the autonomous work machine 10. The details of the ECU 44 will be described below. In such a case as occurrence of abnormality in the autonomous work machine 10, the notification unit 35 issues a notification of the fact. For example, the notification can be issued with voice or display. Alternatively, the occurrence of abnormality can be output to external equipment wirelessly connected to the autonomous work machine 10. The user can be notified of the occurrence of abnormality through the external equipment.

(Block Diagram of Autonomous Work Machine 10)

Figure 3:
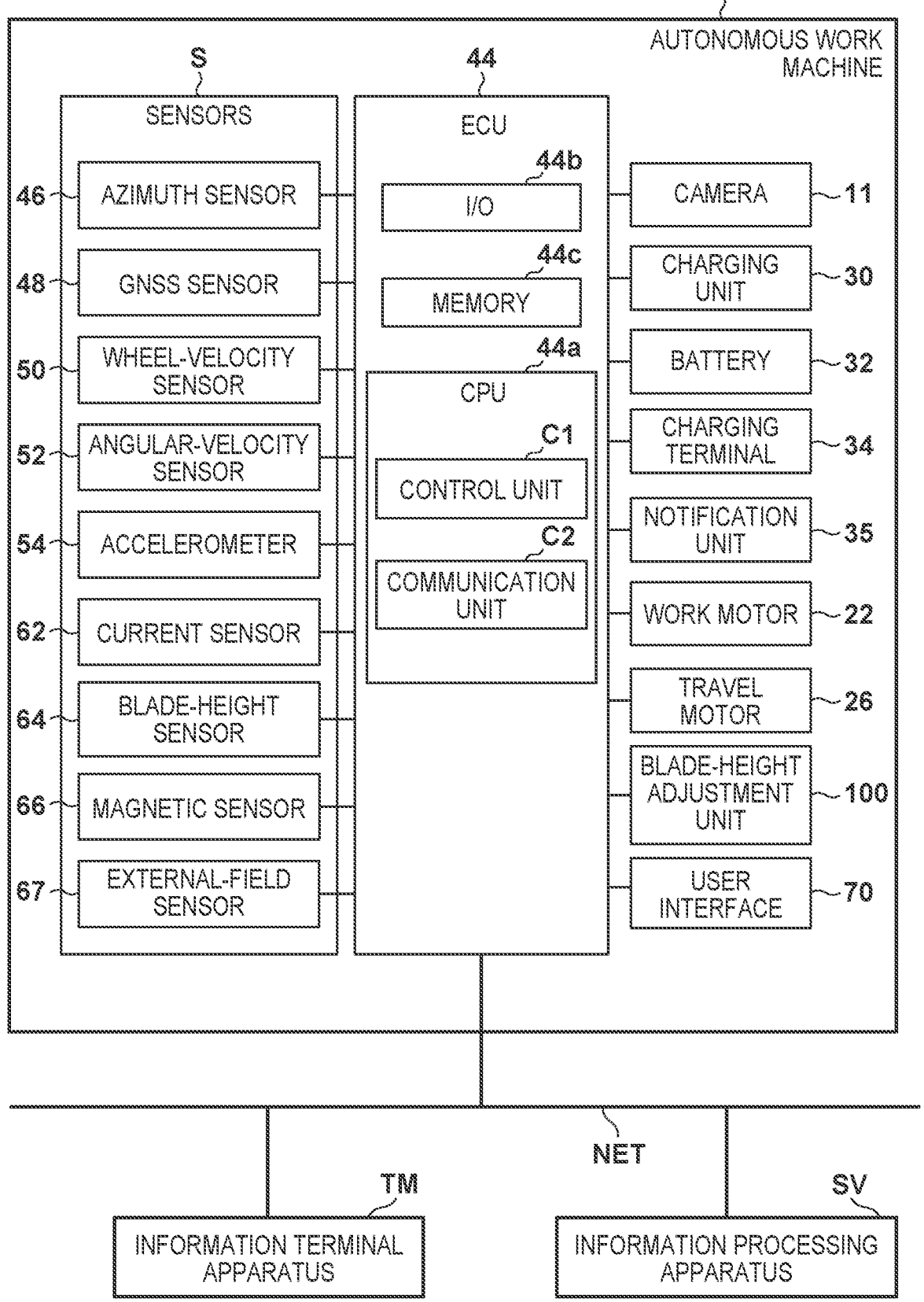
FIG. 3 is a block diagram illustrating the relationship between input and output of an electronic control unit (ECU) that controls the autonomous work machine according to the embodiment.

FIG. 3 is a block diagram illustrating the relationship between input and output of the electronic control unit (ECU) that controls the autonomous work machine 10. As illustrated in FIG. 3, the ECU 44 includes the CPU 44a, the I/O 44b, and the memory 44c. The memory 44c functions as a storage unit, and includes a read only memory (ROM), an electrically erasable programmable read only memory (EEPROM), a random access memory (RAM), and the like.

The memory 44c stores information regarding a set work area such as a work timetable (work schedule) of the autonomous work machine 10, information regarding the work area, various programs for controlling the operation of the autonomous work machine 10, an area map indicating the shape of the work area, and information such as the identification pattern of an area signal corresponding to an energization mode set to the work area. The autonomous work machine 10 can perform predetermined work while traveling autonomously within the work area, on the basis of the area map of the work area. The processing unit 311 of the information processing apparatus SV can transmit (download), to the autonomous work machine 10, the information regarding the work area and the information regarding such as the identification pattern of the area signal corresponding to the energization mode set to the work area, and can set such information to the autonomous work machine 10. Alternatively, the information regarding the work area and the information such as the identification pattern can be set through the user interface 70 of the autonomous work machine 10.

In order to operate as each processing unit for achieving the present invention, the CPU 44a reads and executes a program stored in the memory 44c. As a functional configuration of each processing unit for realizing the present invention, the CPU 44a functions as the control unit C1 and a communication unit C2.

On the basis of information detected by the group of various sensors S and processing results of image information, the control unit C1 controls the various motor driving units (work motor 22, travel motor 26, blade-height adjustment unit 100) to control autonomous traveling and execution of work in the work area. The control unit C1 also performs processing on image information regarding the surroundings shot by the camera 11 and processing on communication information acquired by the communication unit C2 to be described below.

The control unit C1 of the autonomous work machine 10 controls a driving unit (for example, the travel motor 26) for autonomous traveling, on the basis of the position information of the work area and the identification pattern.

The I/O 44b of the ECU 44 functions as a communication interface. The communication unit C2 can bidirectionally communicate with the control apparatus (information processing apparatus SV, information terminal apparatus TM) and the station ST (charging station ST1 and return station ST2) on the network NET wirelessly through the I/O 44b.

The ECU 44 is connected to the group of various sensors S. The group of various sensors S includes an azimuth sensor 46, a global navigation satellite system (GNSS) sensor 48, a wheel-velocity sensor 50, an angular-velocity sensor 52, an accelerometer 54, a current sensor 62, a blade-height sensor 64, a magnetic sensor 66, and the others.

The GNSS sensor 48 and the azimuth sensor 46 acquire information regarding the position and orientation of the autonomous work machine 10. The azimuth sensor 46 detects the azimuth on the basis of the geomagnetic field. The GNSS sensor 48 receives a radio wave (GNSS signal) transmitted from a positioning satellite and detects information indicating the current position (latitude, longitude) of the autonomous work machine 10.

The wheel-velocity sensor 50, the angular-velocity sensor 52, and the accelerometer 54 acquire information regarding a movement state of the autonomous work machine 10. The wheel-velocity sensor 50 detects the wheel velocity of the left and right rear wheels 16. The angular-velocity sensor 52 detects an angular velocity around the axis in the up-anddown direction (z axis in the vertical direction) at the position of the center of gravity of the autonomous work machine 10. The accelerometer 54 detects accelerations in the orthogonally triaxial directions of x, y, and z axes acting on the autonomous work machine 10.

The current sensor 62 detects the current consumption (amount of power consumption) of the battery 32. The detection result of the current consumption (amount of power consumption) is stored in the memory 44c of the ECU 44. In a case where a predetermined amount of power is consumed and the amount of power accumulated in the battery 32 becomes not more than a threshold, the ECU 44 causes the autonomous work machine 10 to arrive back to the charging station ST1 for charging.

The blade-height sensor 64 detects the height of the blade 20 to the ground surface GR. The detection result of the blade-height sensor 64 is output to the ECU 44. On the basis of control of the ECU 44, the blade-height adjustment unit 100 is driven and the blade 20 moves up and down in the up-and-down direction, so that the height from the ground surface GR is adjusted.

The magnetic sensor 66 includes a left magnetic sensor 66L and a right magnetic sensor 66R disposed one-to-one at symmetrical positions in the left-and-right direction of the autonomous work machine 10. The left magnetic sensor 66L and the right magnetic sensor 66R each detect a magnetic field generated from the area wire and outputs a signal indicating the strength of the magnetic field (intensity of the magnetic field) to the ECU 44. An external-field sensor 67 includes, for example, a lidar detection unit that detects, with light, an object around the autonomous work machine 10, and a radar detection unit that detects, with radio waves, an object around the autonomous work machine 10.

Output of the group of various sensors S is input to the ECU 44 through the I/O 44b. The control unit C1 in the ECU 44 monitors the output of the magnetic sensor 66 (left magnetic sensor 66L, right magnetic sensor 66R). In a case where the detected magnetic field has a predetermined value, the control unit C1 determines the outer periphery (peripheral edge) of the work area. Then, on the basis of the determination result of the outer periphery (peripheral edge) of the work area, the control unit C1 controls the travel motor 26 (left travel motor 26L, right travel motor 26R) to control the movement direction of the autonomous work machine 10. For example, while maintaining the intensity of the magnetic field detected by the magnetic sensor 66 (66L, 66R) at the predetermined value, the control unit C1 can control, for example, traveling along the area wire, changing the movement direction at a position near the outer periphery (peripheral edge) of the work area, or reversing the movement direction. On the basis of the information acquired from, for example, the GNSS sensor 48, the camera 11, the external-field sensor 67 including the lidar detection unit and the radar detection unit, the control unit C1 can also control movement while estimating the self-position of the control unit C1 and control movement of the autonomous work machine 10 by determining the vicinity of the boundary of the outer periphery of the work area on the basis of the magnetic field of the area wire.

In addition, the control unit C1 in the ECU 44 supplies power from the battery 32 to the travel motor 26, the work motor 22, and the blade-height adjustment unit 100 on the basis of the output of the group of various sensors S. The control unit C1 in the ECU 44 outputs a control value through the I/O 44b and controls the travel motor 26, so that traveling of the autonomous work machine 10 is controlled. The control unit C1 also outputs a control value through the I/O 44b and controls the blade-height adjustment unit 100, so that the height of the blade 20 is adjusted. The control unit C1 further outputs a control value through the I/O 44b and controls the work motor 22, so that rotation of the blade 20 is controlled.

(Block Diagram of Charging Station ST1)

FIG. 4 is a block diagram illustrating the configuration of the charging station ST1. As illustrated in FIG. 4, the charging station ST1 is connected to a power source 402 through an outlet 404. The charging station ST1 includes an AC/DC converter 406, the charging terminal 408, the signal generator 412, a communication unit 413, and the station ECU 410. The station ECU 410 includes a microcomputer that controls the respective operations of the AC/DC converter 406 and the signal generator 412. The station ECU 410 and the signal generator 412 functions as the energization unit.

The communication unit 413 can bidirectionally communicate with the control apparatus (information processing apparatus SV, information terminal apparatus TM) and the autonomous work machine 10 through the network NET. In response to reception, by the communication unit 413, of the energization mode transmitted from the information processing apparatus SV, different energization modes are set to the energization unit (410, 412) such that the area signals corresponding to a plurality of adjacent work areas are not identical mutually. The energization units (410, 412) energize the area wires disposed on the outer peripheries of the plurality of adjacent work areas, on the basis of the set energization modes.

In the charging station ST1, alternating current (AC) transmitted from the power source 402 through the outlet 404 is converted into the direct current (DC) corresponding to a predetermined voltage by the AC/DC converter 406 and transmitted to the charging terminal 408. In response to connection (docking) of an autonomous work machine 10 having returned to the charging station ST1, with the charging station ST1 through the charging terminal 408 and the charging terminal 34 of the charging station ST1, the battery 32 of the autonomous work machine 10 is charged by the voltage supplied through the charging terminal 408 and the charging terminal 34.

Output of the AC/DC converter 406 is supplied to the signal generator 412 and the station ECU 410. The station ECU 410 controls the operation of the signal generator 412 on the basis of the output of the AC/DC converter 406.

In accordance with a control command from the station ECU 410, the signal generator 412 converts the direct current adjusted by the AC/DC converter 406 into a predetermined current signal, so that different current signals are energized one-to-one to the area wires WR1, WR2, and WR3. The area wires WR1, WR2, and WR3 each generate an area signal (electromagnetic wave) different in type (for example, frequency or phase) on the basis of the corresponding current signal from the signal generator 412.

The memory 44c of an autonomous work machine 10 stores information regarding an assigned work area and information such as the identification pattern of the area signal corresponding to the energization mode set to the work area.

FIG. 10 exemplarily illustrates the identification patterns of area signals corresponding to energization modes. To the energization mode 1 (Mod1), the frequency f1 is set as a basic area signal (for example, a sinusoidal signal). To the energization mode 2 (Mod2), the frequency f2 different from the frequency f1 is set. Similarly, to the energization modes 3 (Mod3) and 4 (Mod4), the frequencies f3 and f4 different from the frequencies f1 and f2 are set, respectively. FIG. 10 exemplifies the frequencies as the identification patterns. However, phase or voltage may be varied as the identification patterns of the energization modes 2, 3, and 4 to the basic area signal of the energization mode 1. The processing unit 311 can set the energization modes such that the area signals corresponding to the plurality of adjacent work areas are different in at least one of the frequency, the phase, and the voltage. In the setting of the energization modes, any combination of the frequency, the phase, and the voltage may be used.

For example, in a case where the identification pattern 1 is set to the work area AR1, the identification pattern 2 is set to the work area AR2, and the identification pattern 3 is set to the work area AR3, the magnetic sensor 66 of the autonomous work machine 10 that works in the work area AR1 is required to detect the area signal of the identification pattern 1. Similarly, the magnetic sensor 66 of the autonomous work machine 10 that works in the work area AR2 is required to detect the area signal of the identification pattern 2. The magnetic sensor 66 of the autonomous work machine 10 that works in the work area AR3 is required to detect the area signal of the identification pattern 3.

Thus, the magnetic sensor 66 of the autonomous work machine 10 disposed in each of the work areas AR1, AR2, and AR3 can distinctively detect the area signal (electromagnetic wave) of the corresponding area wire without mutual interference.

(Block Diagram of Information Processing Apparatus SV)

Figure 5:
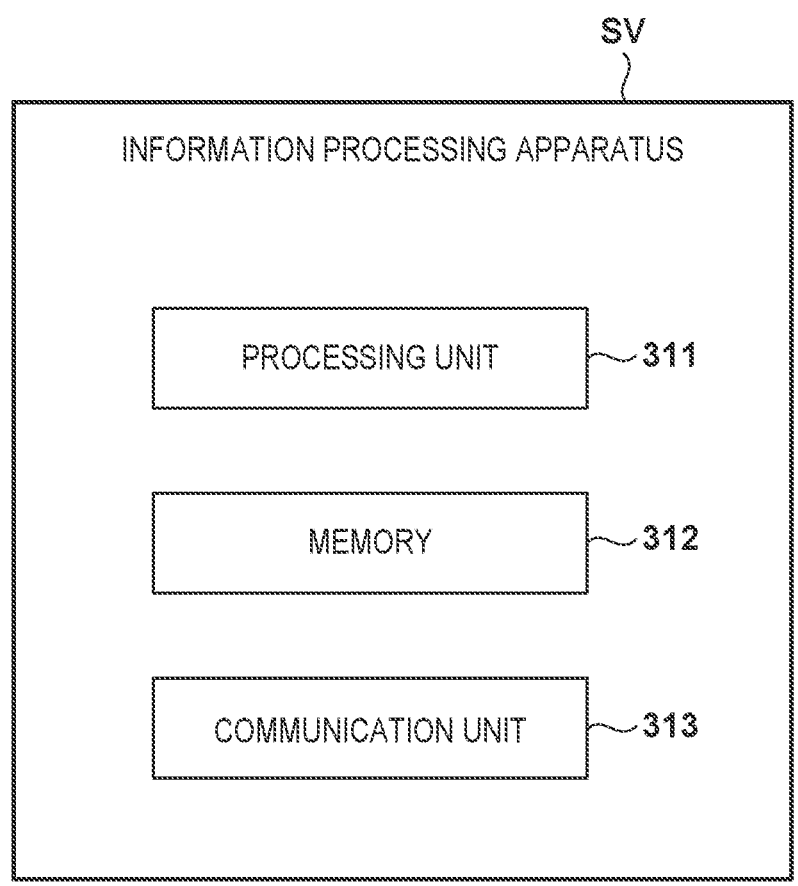
FIG. 5 is a block diagram illustrating the configuration of an information processing apparatus according to the embodiment.

FIG. 5 is a block diagram illustrating the configuration of the information processing apparatus SV (server). The information processing apparatus SV (server) functions as a server that controls an autonomous work machine 10. For example, the information processing apparatus SV (server) can manage and control information of a plurality of autonomous work machines 10. The information processing apparatus SV (server) includes the processing unit 311, a memory 312, and the communication unit 313. The processing unit 311 is a processor represented by a CPU, and executes a program stored in the memory 312. The memory 312 functions as a storage device, and includes a read only memory (ROM), an electrically erasable programmable read only memory (EEPROM), a random access memory (RAM), a hard disk drive (HDD), and the like. The communication unit 313 is a communication device for communication with an autonomous work machine 10, the information terminal apparatus TM (portable terminal), and the station ST (charging station ST1 and return station ST2) through the network NET.

The memory 312 stores the position information of a plurality of work areas AR1, AR2, AR3, and . . . . In a case where a plurality of adjacent work areas at adjacent positions is present, the processing unit 311 sets different energization modes on the basis of the position information acquired from the memory 312 such that the area signals corresponding to the plurality of adjacent work areas are not identical mutually.

The processing unit 311 transmits the set energization modes to the station ST (charging station ST1, return station ST2) through the communication unit 313, and sets the energization modes to the energization units (410, 412) that energize the area wires of the plurality of adjacent work areas. In response to reception, by the communication unit 413 of the station ST, of the energization modes transmitted from the information processing apparatus SV, the energization unit (410, 412) of the station ST energizes the area wires disposed on the outer peripheries of the plurality of adjacent work areas, on the basis of the set energization modes.

The processing unit 311 transmits the identification pattern of the area signal corresponding to the energization mode set to each of the plurality of adjacent work areas to the corresponding autonomous work machine 10 through the communication unit 313, and sets the identification pattern to the autonomous work machine 10 that works in the corresponding adjacent work area.

Here, the processing unit 311 sets the energization modes such that the respective area signals in the plurality of adjacent work areas are different in frequency. Alternatively, the processing unit 311 sets the energization modes such that the respective area signals in the plurality of adjacent work areas are different in phase. The processing unit 311 can also set the energization modes by combination frequency and phase such that the respective area signals in the plurality of adjacent work areas are different.

Every certain period, the energization unit (410, 412) transmits, to the information processing apparatus SV (processing unit 311), the position information of the work area corresponding to an area wire in energization and the identification pattern (energization mode) of the area signal corresponding to the energization mode. The processing unit 311 of the information processing apparatus SV stores, in the memory 312, the position information of the work area and the identification pattern (energization mode) transmitted from the energization unit (410, 412). Then, in a case where the position information of the work area and the identification pattern (energization mode) are not received from the energization unit (410, 412) after the elapse of the certain period, the processing unit 311 deletes the position information of the work area and the identification pattern (energization mode) from the memory 312. As a result, for example, even in a case where a work area in which no work is performed seasonally or a work area excluded from a long-term work target is present, the autonomous work system enables automatic deletion of a work area that the position information thereof and the identification pattern are not transmitted for a certain period.

In a case where the processing unit 311 receives again, from the energization unit (410, 412), the position information of the work area and the identification pattern (energization mode) deleted from the memory 312 after the elapse of a certain period, the processing unit 311 stores (resets) again, in the memory 312, the position information of the work area and the identification pattern (energization mode) received again. In the resetting of the identification pattern (energization mode), the processing unit 311 sets a different energization mode such that the energization mode is not identical to the area signal already set in an adjacent work area. As a result, in a case where a work area excluded from the long-term work target is returned as a work target, the autonomous work system can automatically recover the information regarding the returned work area.

(Processing of Autonomous Work System)

Figure 6:
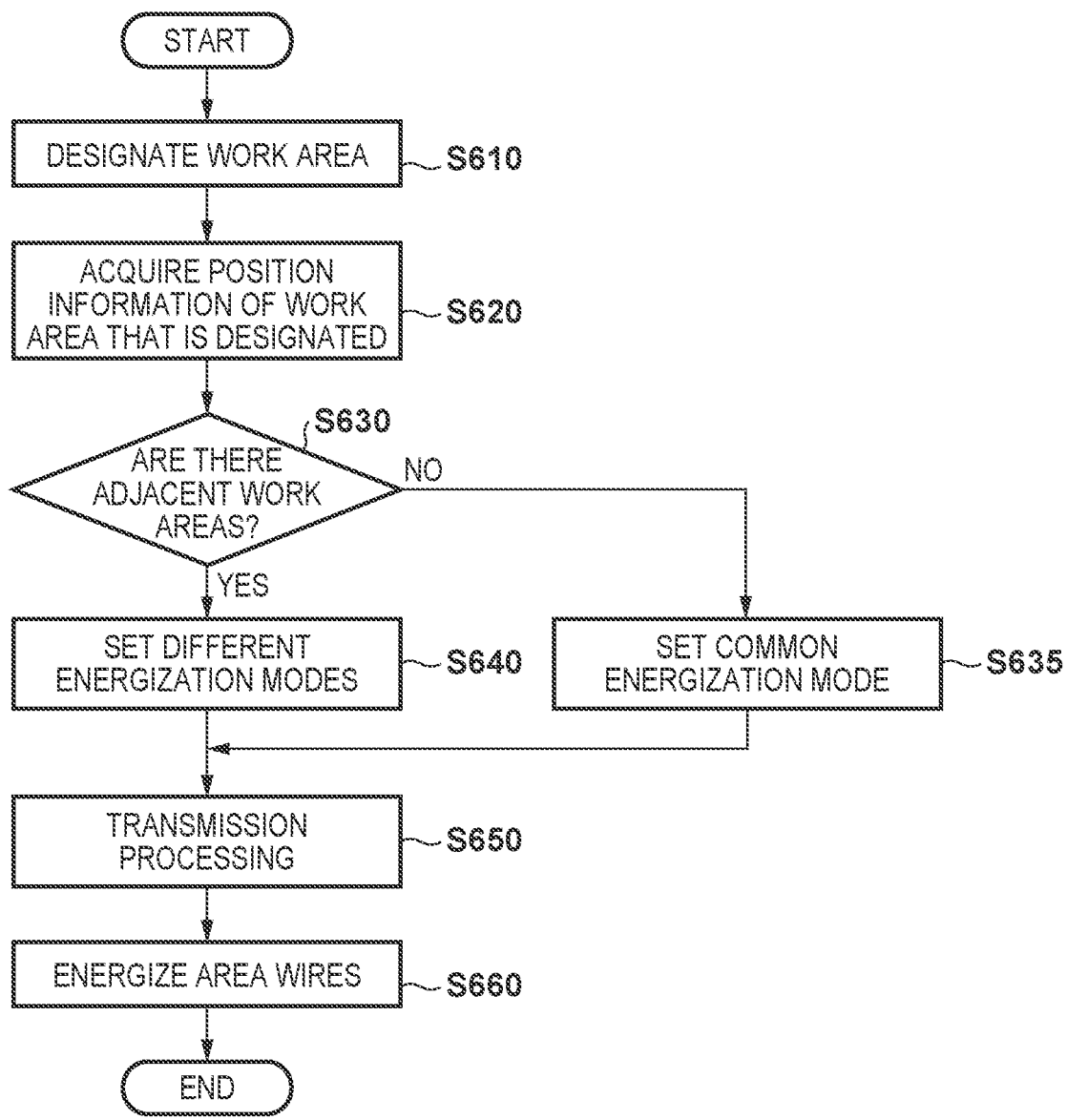
FIG. 6 is an explanatory flowchart illustrating processing of the autonomous work system according to the embodiment.
Figure 7:
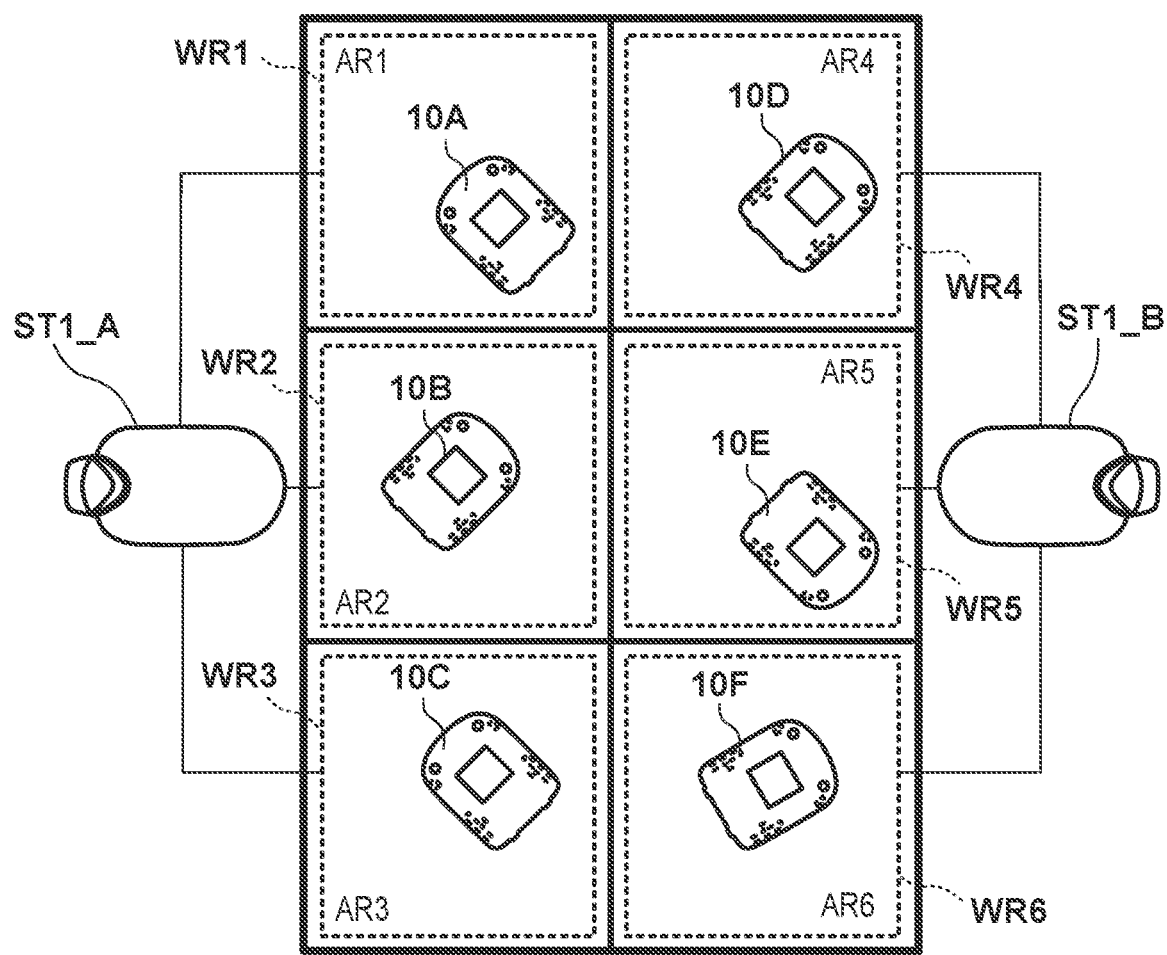
FIG. 7 schematically illustrates an exemplary disposition of a plurality of work areas according to the embodiment.
Figure 8:
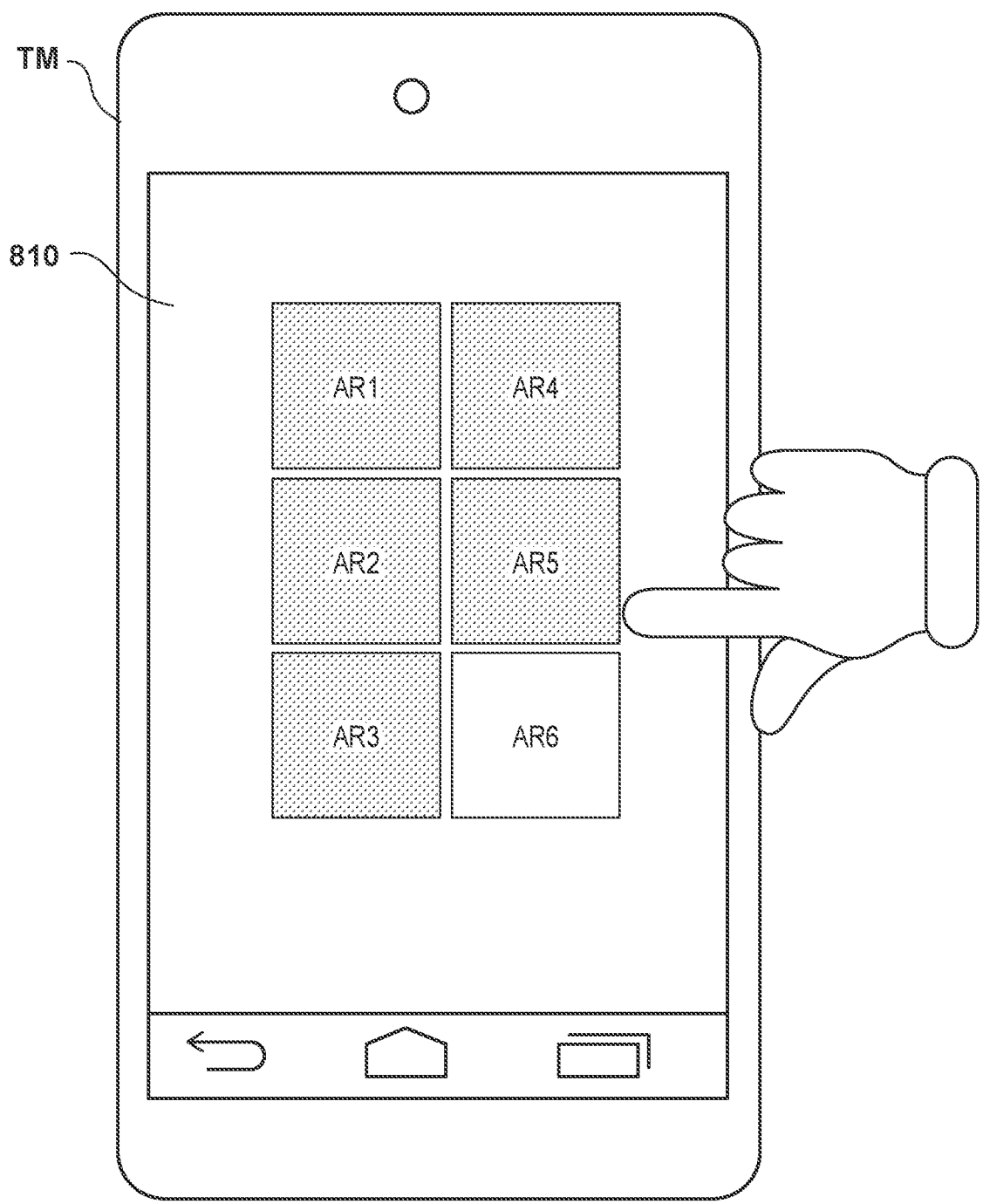
FIG. 8 schematically illustrates an operation of designating a work area from a display screen of an information processing terminal according to the embodiment.

FIG. 6 is an explanatory flowchart illustrating processing of the autonomous work system according to the embodiment. First, in step S610, a work area is designated. Here, FIG. 7 schematically illustrates an exemplary disposition of a plurality of work areas according to the embodiment. FIG. 8 schematically illustrates an operation of designating a work area from a display screen of the information terminal apparatus TM according to the embodiment. The information terminal apparatus TM designates a plurality of designation work areas in which a plurality of autonomous work machines works, among a plurality of work areas displayed on a display unit 810.

As illustrated in FIG. 7, work areas AR1 to AR6 are disposed, and the respective autonomous work machines work in the work areas are indicated by 10A to 10F. Area wires WR1 to WR6 are disposed one-to-one on the outer peripheries (peripheral edges) of the work areas AR1 to AR6. In FIG. 7, two charging stations ST1_A and ST1_B are disposed. The charging station ST1_A is connected to the area wires WR1 to WR3, and can energize the area wires WR1 to WR3. The charging station ST1_B is connected to the area wires WR4 to WR6, and can energize the area wires WR4 to WR6.

The display screen of the information terminal apparatus TM in FIG. 8 corresponds to the disposition of the work areas AR1 to AR6 illustrated in FIG. 7. The user can perform a touch operation on the display screen of the information terminal apparatus TM to designate a work area as a work target. In FIG. 8, the work areas AR1 to AR5 are hatched and displayed, indicating that the work areas AR1 to AR5 are designated by the user as work targets.

In step S620, in response to the designation of the work area from the display screen of the information terminal apparatus TM, the processing unit 311 of the information processing apparatus SV acquires the position information of the work area that is designated. The memory 312 of the information processing apparatus SV stores the position information of a plurality of work areas, and the processing unit 311 acquires, from the memory 312, the position information of the work area that is designated. The processing unit 311 acquires, from the memory 312, the position information of the work areas AR1 to AR5 designated in the step S610.

FIG. 9 exemplarily illustrates the position information of the work areas stored in the memory of the information processing apparatus according to the embodiment. In the example of FIG. 9, an example of the shape of each work area is a rectangle, and the position information of each work area is indicated by the position coordinates at two diagonal points in the reference coordinate system. The setting of the shape of the work areas and the position information are not limited thereto. In addition, the shape of each work area is not limited to a rectangle, and thus can be set as any shape. As a way of inputting a work area, for example, a worker who lays an area wire may input by tracing the work area on the display screen (touch panel) of the information terminal apparatus TM with a map displayed. Alternatively, the worker in possession of equipment (for example, a smartphone) that can acquire position information may move above a laid area wire, and may register a region determined by the position information of the area wire above which the worker has moved, as a work area of a work target.

In step S630, the processing unit 311 determines, on the basis of the position information acquired from the memory 312, whether or not a plurality of adjacent work areas at adjacent positions is present among the plurality of designation work areas designated by the information terminal apparatus TM. Here, an adjacent work area refers to a work area located in contact with at least part of the boundary of each work area, or a work area located with at least part of a work area located adjacently within a predetermined distance. In FIG. 7, a predetermined distance is omitted for convenience of illustration.

In the disposition example of FIG. 7, the work area AR1 has one outer peripheral side in contact with one outer peripheral side of the work area AR2 and has one outer peripheral side in contact with of one outer peripheral side of the work area AR4 (or separated from one outer peripheral side of the work area AR2 and separated from one outer peripheral side of the AR4 within a predetermined distance). In the disposition examples of FIGS. 7 and 8, the outer periphery of the work area AR1 has one corner portion in contact with one corner portion of the outer periphery of the work area AR5 (or separated from one corner portion of the outer periphery of the work area AR5 within a predetermined distance). In this case, the processing unit 311 determines that the work area AR1 is adjacent to the work areas AR2, AR4, and AR5.

Similarly, the processing unit 311 determines that the work area AR2 is adjacent to the work areas AR1, AR3, AR4, and AR5. In such a manner, the processing unit 311 determines whether or not an adjacent work area is present, for each work area that is designated. Even in a case where four or more adjacent work areas are present, the processing unit 311 is required to perform setting on the basis of a combination of at least four types of energization modes, with a so-called four-color-theorem approach.

In the determination processing of step S630, in a case where no adjacent work area is present (S630—No), the processing unit 311 advances the processing to step S635. In step S635, the processing unit 311 of the information processing apparatus SV sets a common energization mode to each work area that is designated. For example, the processing unit 311 sets the energization mode 1 (Mod1) described with reference to FIG. 10. In this case, the processing unit 311 sets a basic area signal (for example, a sinusoidal signal at the frequency f1) corresponding to energization mode 1 (Mod1).

Otherwise, in the determination processing of step S630, in a case where an adjacent work area is present (S630—Yes), the processing unit 311 advances the processing to step S640.

In step S640, in a case where a plurality of adjacent work areas is present among the plurality of designation work areas designated by the information terminal apparatus TM, the processing unit 311 sets different energization modes such that the area signals corresponding to the plurality of adjacent work areas are not identical mutually. That is, in a case where a plurality of adjacent work areas at adjacent positions is present, on the basis of the position information, the processing unit 311 sets different energization modes such that the area signals corresponding to the plurality of adjacent work areas are not identical mutually. As illustrated in FIG. 10, the processing unit 311 also sets the different energization modes (Mod1 to Mod4), and sets the identification patterns (f1 to f4) of the area signals corresponding to the set energization modes.

In step S650, the processing unit 311 transmits the set energization modes to the station ST (charging station ST1, return station ST2) through the communication unit 313, and sets the energization modes (for example, Mod1 to Mod4) to the energization unit (410, 412) that energize the area wires of the plurality of adjacent work areas. The processing unit 311 also transmits the identification patterns (for example, the frequencies f1 to f4) of the area signals corresponding to the energization modes to autonomous work machines 10 through the communication unit 313, and sets the respective identification patterns to the autonomous work machines 10 that work in the plurality of adjacent work areas.

In a case where no adjacent work area is present (S630—No) and the common energization mode has been set (S635), the processing unit 311 transmits the common energization mode (for example, Mod1) to the station ST through the communication unit 313, and sets the energization mode to the energization unit (410, 412) that energizes the area wire of each work area that is designated. The processing unit 311 also transmits the identification pattern (for example, a sinusoidal signal at frequency f1) of the area signal corresponding to the common energization mode to the autonomous work machines 10 through the communication unit 313, and sets the identification pattern to each autonomous work machine 10 that works in the corresponding work area that is designated.

In step S660, the energization unit (410, 412) of the station ST energizes the area wires disposed on the outer peripheries of the plurality of adjacent work areas, on the basis of the set energization modes (Mod1 to Mod4).

In a case where no adjacent work area is present (S630—No) and the common energization mode is set (S635), the energization unit (410, 412) energizes the area wire disposed on the outer periphery of each work area that is designated, on the basis of the set energization mode (Mod1).

<Modifications>

In the embodiment described above, there has been described the example in which it is determined whether or not an adjacent work area is present on the basis of the position information of the work area that is designated, and an energization mode is set on the basis of the determination result. In setting of such an energization mode, the energization mode also can be set on the basis of the determination result of the position information and the determination result of whether or not autonomous work machines overlap in work schedule.

Figure 11:
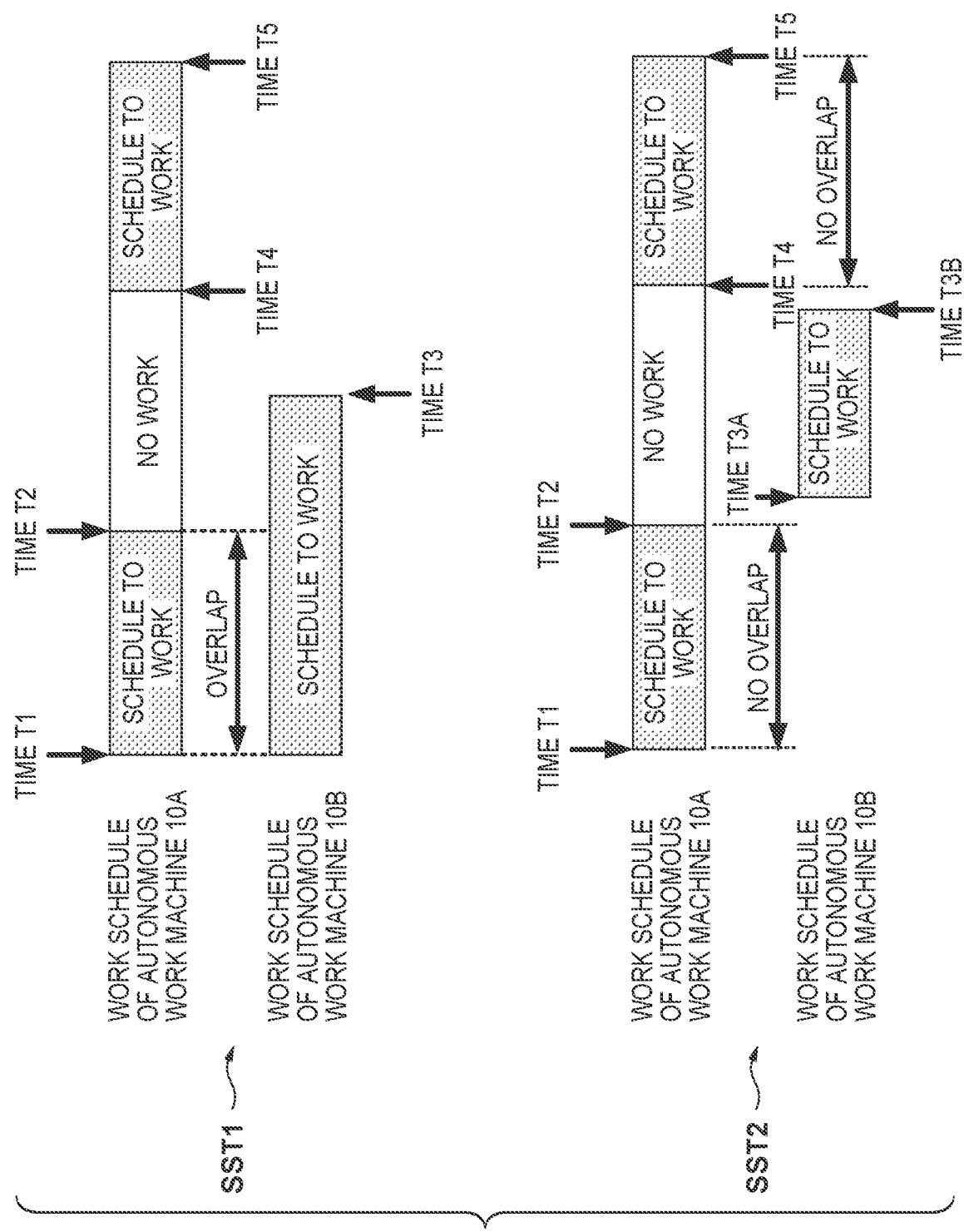
FIG. 11 explanatorily illustrates overlap in work schedule.

FIG. 11 explanatorily illustrates overlap in work schedule. SST1 indicates the case of overlap in work schedule, and SST2 indicates the case of no overlap in work schedule. FIG. 11 exemplifies an autonomous work machine 10A in a work area AR1 and an autonomous work machine 10B in a work area AR2 as autonomous work machines.

In SST1, the autonomous work machine 10A is scheduled to work between time T1 and time T2, and no work is performed between time T2 and time T4. Then, the autonomous work machine 10A is scheduled to work between the time T4 and time T5.

The autonomous work machine 10B is scheduled to work between the time T1 and the time T3, and the autonomous work machine 10A and the autonomous work machine 10B overlap in work schedule between the time T1 and the time T2.

In this case, in a case where a plurality of adjacent work areas at adjacent positions is present (S630—Yes) in S630 of FIG. 6 described above and the respective autonomous work machines that work in the plurality of adjacent work areas overlap in work schedule, the processing unit 311 of the information processing apparatus SV sets different energization modes to the plurality of adjacent work areas (S640).

However, in the SST2, a work schedule for the autonomous work machine 10A is set similarly to the SST1, whereas a work schedule for the autonomous work machine 10B is changed from the work schedule in the SST1. The autonomous work machine 10B is scheduled to work between time T3A and time T3B, and the autonomous work machine 10A and the autonomous work machine 10B do not overlap in work schedule.

In this case, even in a case where a plurality of adjacent work areas at adjacent positions is present in S630 of FIG. 6 described above (S630—Yes), if the autonomous work machines that work in the plurality of adjacent work areas do not overlap in work schedule, the processing unit 311 of the information processing apparatus SV advances the processing to S635 of FIG. 6, and sets a common energization mode for each work area that is designated. That is, even in a case where a plurality of adjacent work areas at adjacent positions is present, if the autonomous work machines do not overlap in work schedule, there is no influence due to interference between area signals. Thus, it is necessary to set a common energization mode to each work area that is designated. This setting enables reduction in processing load required for energization control for each area wire in the energization unit (410, 412).

<Other Embodiment>

In addition, a program for realizing each function of such an autonomous work machine 10 and an information processing apparatus SV as described in the embodiment can be supplied to the autonomous work machine 10 and the information processing apparatus SV through a network or a storage medium, and one or more processors in a computer of each of the autonomous work machine 10 and the information processing apparatus SV can read and execute the program.

<Summary of Embodiment>

Configuration 1. The autonomous work system according to the above embodiment is an autonomous work system (for example, STM in FIG. 1) that controls an autonomous work machine (for example, 10 in FIG. 1) that detects a magnetic field of an area signal generated by energization to an area wire disposed on an outer periphery of a work area, specifies a boundary of the work area based on the magnetic field, and works autonomously in the work area, the autonomous work system including:

a storage unit (for example, 312 in FIG. 5) configured to store position information (for example, FIG. 9) of a plurality of the work areas (for example, AR1 to AR3 in FIG. 1, AR1 to AR6 in FIG. 7);

a setting unit (for example, 311 in FIG. 5) configured to set, based on the position information, different energization modes (for example, Mod1 to Mod4 in FIG. 10), in a case where a plurality of adjacent work areas at adjacent positions is present, such that the area signals corresponding to the plurality of adjacent work areas are not identical mutually; and an energization unit (for example, 410, 412 in FIG. 4) configured to energize, based on the energization modes, the area wires (for example, WR1 to WR3 in FIG. 1) disposed on the respective outer peripheries of the plurality of adjacent work areas.

The autonomous work system of Configuration 1 enables suppressing interference between the area signals by setting the different energization modes such that the area signals corresponding to the plurality of adjacent work areas at adjacent positions are not identical mutually.

Configuration 2. In the autonomous work system (STM) of the above embodiment, the setting unit (311) transmits, through a communication unit (for example, 313 in FIG. 5) an identification pattern of the area signal corresponding to the energization mode set to each of the plurality of adjacent work areas, and sets the identification pattern to the autonomous work machine that works in each of the plurality of adjacent work areas.

The autonomous work system of Configuration 2 enables the autonomous work machine that works in each of the plurality of adjacent work areas, to work autonomously by distinctively detecting the area signal of the corresponding area wire without mutual interference.

Configuration 3. In the autonomous work system (STM) of the above embodiment, the setting unit (311) transmits the energization modes through a communication unit (for example, 313 in FIG. 5), and sets the energization modes to the energization unit (410, 412).

The autonomous work system of Configuration 3 enables, in a case where the plurality of adjacent work areas is present, generation of the area signals mutually different in type, resulting in suppressing mutual interference between the area signals.

Configuration 4. In the autonomous work system (STM) of the above embodiment, the autonomous work machine (10) includes:

a driving unit (for example, 26 in FIG. 3) configured to cause the autonomous work machine (10) to travel autonomously; and a control unit (for example, C1 in FIG. 3) configured to control the driving unit, in which the control unit (C1) controls the driving unit (26) based on the position information of the work area and the identification pattern.

The autonomous work system of Configuration 4 enables the autonomous work machine that works in each of the plurality of adjacent work areas, to work autonomously by distinctively detecting the area signal of the corresponding area wire without mutual interference, based on the identification pattern.

Configuration 5. In the autonomous work system (STM) of the embodiment, the setting unit (311) sets the energization modes such that the area signals corresponding to the plurality of adjacent work areas are different in at least one of frequency, phase, and voltage.

Configuration 6. In the autonomous work system (STM) of the above embodiment, the setting unit (311) sets the energization modes such that the area signals corresponding to the plurality of adjacent work areas are different in combination of the frequency, the phase, and the voltage.

The autonomous work system of Configuration 5 and the autonomous work system of Configuration 6 each enable, in a case where the plurality of adjacent work areas is present, generation of the area signals mutually different in type, resulting in suppressing mutual interference between the area signals.

Configuration 7. The autonomous work system (STM) according to the above embodiment further includes:

a charging unit (for example, ST1 in FIG. 4) configured to supply power to a battery (for example, 32 in FIG. 3) mounted on the autonomous work machine for charging, in which the charging unit (ST1) includes the energization unit (410, 412).

The autonomous work system of Configuration 7 enables the charging station that supplies power to the battery mounted on the autonomous work machine for charging, to control the energization to the area wire based on the set energization mode. This configuration enables simplification of the system configuration without providing a separate energization apparatus.

Configuration 8. The autonomous work system (STM) of the embodiment further includes: a designation unit (for example, TM in FIG. 1) configured to designate a plurality of designation work areas in which a plurality of the autonomous work machines works, among the plurality of the work areas displayed on a display unit.

Configuration 9. In the autonomous work system (STM) of the above embodiment, the setting unit (311) determines, based on the position information acquired from the storage unit (312), whether or not the plurality of adjacent work areas at adjacent positions is present among the plurality of designation work areas designated by the designation unit.

Configuration 10. In the autonomous work system (STM) of the above embodiment, in a case where the plurality of adjacent work areas is present among the plurality of designation work areas, the setting unit (311) sets the different energization modes such that the area signals corresponding to the plurality of adjacent work areas are not identical mutually.

The autonomous work system of Configuration 8, the autonomous work system of Configuration 9, and the autonomous work system of Configuration 10 each enable the user to grasp visually the disposition of a plurality of work areas by a display of a display unit of the information processing terminal. Thus, the user can designate a plurality of designation work areas from the disposition of the work areas displayed on the display unit. As a result, the work load of the user can be reduced. In addition, the information of the plurality of designation work areas designated by the information processing terminal is transmitted to an information processing apparatus SV through a network NET. The information processing apparatus SV can determine, by determination processing based on the position information, whether or not a plurality of adjacent work areas at adjacent positions is present among the plurality of designation work areas designated by the information processing terminal.

Configuration 11. In the autonomous work system (STM) of the above embodiment, in a case where the plurality of adjacent work areas at adjacent positions is present (for example, S630—Yes in FIG. 6) and the respective autonomous work machines that work in the plurality of adjacent work areas overlap in work schedule (for example, SST1 in FIG. 11), the setting unit (311) sets the different energization modes to the plurality of adjacent work areas.

The autonomous work system of Configuration 11 enables setting of a common energization mode to each work area that is designated, because, in a case where the plurality of adjacent work areas at adjacent positions is present, if the autonomous work machines do not overlap in work schedule, there is no influence due to interference between area signals. This setting enables reduction in processing load required for energization control for each area wire in the energization unit (410, 412).

Configuration 12. In the autonomous work system (STM) of the above embodiment, every certain period, the energization unit (410, 412) transmits, to the setting unit (311), the position information of the work area corresponding to an area wire in energization and an identification pattern of the area signal corresponding to the energization mode, and the setting unit (311)

stores, in the storage unit (312), the position information of the work area and the identification pattern transmitted from the energization unit (410, 412), and deletes, from the storage unit (312), in a case where the position information of the work area and the identification pattern are not received from the energization unit (410, 412) after an elapse of the certain period, the position information of the work area and the identification pattern.

The autonomous work system of Configuration 12 enables, for example, even in a case where a work area in which no work is performed seasonally or a work area excluded from a long-term work target is present, automatic deletion of a work area that the position information thereof and the identification pattern are not transmitted for a certain period.

Configuration 13. In the autonomous work system (STM) of the above embodiment, in a case where the setting unit (311) receives again, from the energization unit (410, 412), the position information of the work area and the identification pattern deleted from the storage unit (312) after the elapse of the certain period, the setting unit (312) stores again, in the storage unit, the position information of the work area and the identification pattern received again.

The autonomous work system of Configuration 13 enables, in a case where a work area excluded from a long-term work target is returned as a work target, automatic recovery of information regarding the returned work area.

The invention is not limited to the foregoing embodiments, and various variations/changes are possible within the spirit of the invention.

What is claimed is:

1. An autonomous work system that controls an autonomous work machine that detects a magnetic field of an area signal generated by energization to an area wire disposed on an outer periphery of a work area, specifies a boundary of the work area based on the magnetic field, and works autonomously in the work area, the autonomous work system comprising:
    a memory configured to store position information of a plurality of the work areas;
    a processor circuit executing instructions that, when executed, cause the processor circuit to set, based on the position information, different energization modes, in a case where a plurality of adjacent work areas at adjacent positions is present, such that area signals corresponding to the plurality of adjacent work areas are not identical mutually, wherein in a case where the plurality of adjacent work areas at adjacent positions is present and respective autonomous work machines that work in the plurality of adjacent work areas do not overlap in work schedule, the processor is configured to set a common energization mode to the plurality of adjacent work areas; and
    a station electronic controller configured to energize, based on the different energization modes, the area wires disposed on the respective outer peripheries of the plurality of adjacent work areas, wherein the station electronic controller is configured to energize, based on the common energization mode, the area wires disposed on the respective outer peripheries of the plurality of adjacent work areas in a case where the common energization mode is set by the processor circuit,
    wherein every certain period, the station electronic controller transmits, to the processor circuit, the position information of the work area corresponding to the area wire in energization and an identification pattern of the area signal corresponding to an energization mode, and
    the instructions further cause the processor circuit to:
        store, in the memory, the position information and the identification pattern, and
        delete, from the memory, in a case where the position information and the identification pattern are not received from the station electronic controller after an elapse of the certain period, the position information and the identification pattern.

2. The autonomous work system according to claim 1, wherein the instructions further cause the processor circuit to:
    transmit, through a communication unit, the identification pattern of the area signal corresponding to the energization mode set to each of the plurality of adjacent work areas, and
    set the identification pattern to each of the autonomous work machines that works in each of the plurality of adjacent work areas.

3. The autonomous work system according to claim 2, wherein the autonomous work machine includes:
    a travel motor configured to cause the autonomous work machine to travel autonomously; and
    a controller configured to control the travel motor,
    wherein the controller controls the travel motor based on the position information of the work area and the identification pattern.

4. The autonomous work system according to claim 1, wherein the instructions further cause the processor circuit to:
    transmit the energization modes through a communication unit, and
    set the different energization modes to the station electronic controller.

5. The autonomous work system according to claim 1, wherein the instructions further cause the processor circuit to set the different energization modes such that the area signals corresponding to the plurality of adjacent work areas are different in at least one of frequency, phase, and voltage.

6. The autonomous work system according to claim 5, wherein the instructions further cause the processor circuit to set the different energization modes such that the area signals corresponding to the plurality of adjacent work areas are different in combination of the frequency, the phase, and the voltage.

7. The autonomous work system according to claim 1, further comprising:
    a charging station configured to supply power to a battery mounted on the autonomous work machine for charging,
    wherein the charging station includes the station electronic controller.

8. The autonomous work system according to claim 1, further comprising an information terminal configured to designate a plurality of designation work areas in which respective ones of the autonomous work machines works, among the plurality of the work areas displayed on a display unit.

9. The autonomous work system according to claim 8, wherein the instructions further cause the processor circuit to determine, based on the position information acquired from the memory, whether or not the plurality of adjacent work areas at adjacent positions is present among the plurality of designation work areas designated by the information terminal.

10. The autonomous work system according to claim 1, wherein in a case where the plurality of adjacent work areas at adjacent positions is present and the respective autonomous work machines that work in the plurality of adjacent work areas overlap in work schedule, the instructions further cause the processor circuit to set the different energization modes to the plurality of adjacent work areas.

11. The autonomous work system according to claim 1, wherein in a case where the instructions cause the processor circuit to receive again, from the station electronic controller, the position information of the work area and the identification pattern deleted from the memory after the elapse of the certain period, the instructions further cause the processor circuit to store again, in the memory, the position information of the work area and the identification pattern received again.

\* \* \* \* \*